Patented Jan. 8, 1946

2,392,545

UNITED STATES PATENT OFFICE 2,392,545

PRODUCTION OF METAL HYDRIDES

Maurice M. Pechet, Cambridge, Mass., assignor to Hardy Metallurgical Company, New York, N. Y., a corporation of Delaware No Drawing. Application June 10, 1943,
Serial No. 490,330

8 Claims. (Cl. 23—204)

This invention is concerned with the manufacture of alkali earth metal hydrides. It provides novel and economical methods for the manufacture of barium, strontium, magnesium and calcium hydrides.

Alkali earth metal hydrides and especially calcium hydride find rapidly expanding application in industry. Heretofore such alkali earth metal hydrides have been derived by inorganic processes involving the initial formation of the metal and the production of the hydride from the metal thus formed. By way of example, it has been customary to produce calcium metal by fusion electrolysis of its chloride, and to form the hydride from the metal by reaction with hydrogen.

In accordance with my invention, the hydride is produced directly and the reactions involved are organic in nature. Thus, an alkali earth metal salt of an acid phenol is subjected to the action of hydrogen in an anhydrous atmosphere with resultant formation of the hydride of the metal, together with regeneration of the acid phenol. The acid phenol may be recycled for reaction with oxide of the alkali earth metal to produce an additional quantity of salt which is subjected to the action of hydrogen as described previously.

Although the invention will be described in detail hereinafter with reference to a simple phenol, namely, phenyl hydroxide, it should be understood that the word phenol is employed herein in a broad sense to describe aromatic alcohols and substituents thereof in which the OH is attached directly to the ring, and which have an acid reaction. Thus, the alkali earth metal salts of a variety of acid phenols and derivatives thereof may be employed. For example, alkali earth metal salts of phenyl hydroxide, thymol, cresols, resorcinol, quinol, polyhydroxy phenols, etc., may be employed. Moreover, various substituents of phenols in which some or all of the hydrogens attached to the benzene ring are replaced by carbon, halogen, nitrogen, sulfur, or radicals including these elements may be employed. For example, suitable salts for reaction with hydrogen to produce alkali metal hydrides may be obtained by reacting the corresponding alkali earth metal oxide with any one of the following:

(a) Phenol derivatives such as picric acid, in which nitro groups are substituents on the ring;

(b) Bromophenol and the like in which halogen has been substituted for one or more hydrogen atoms on the ring;

(c) Cresols in which hydrogen has been replaced by a methyl group;

(d) Amino phenols in which an amino group has replaced the hydrogen on the ring; and (e) Even such compounds as beta naphthol, which may be considered as acid phenol derivatives in which two hydrogens have been replaced by an additional benzene ring.

To take a simple example of the practice of my invention, calcium phenolate, a red powder, is produced by reacting phenol, i. e., phenyl hydroxide with calcium oxide. This reaction proceeds at low temperatures and moderate pressures as follows:

$$2C_6H_5OH + CaO = (C_6H_5O)_2Ca$$

The calcium phenolate thus formed is subjected to the action of pure dry hydrogen in an autoclave at a moderate temperature, say atmospheric temperature and at a high pressure, say 2800 lbs. per square inch. The hydrogen reacts with the calcium phenolate and produces a precipitate of calcium hydride dispersed in phenol in the liquid phase. The phenol may be separated from the calcium hydride by distillation and returned for reaction with additional calcium oxide to form the required phenolate.

As indicated above, the manufacture of the phenolate is relatively simple. The acid phenol or phenolic derivative is simply reacted with the oxide of the alkali earth metal. Examples include the reaction of picric acid with lime to form calcium picrate, the reaction of p-bromophenol with CaO to form the corresponding phenolate, the reaction of cresol with lime to form a phenolate in which one hydrogen on the ring is replaced by a methyl group, the reaction of p-amino phenol with lime to form the corresponding phenolate, and the formation of the calcium salt of beta naphthol.

The reaction of the phenolate with the hydrogen to produce the alkali metal hydride requires more careful control than does the formation of the phenolate. In general, the reaction is furthered by low temperature and high pressure. Room temperature is most desirable but the hydrides may be formed at temperatures as high as 400° C. Yield and speed of reaction are greatly increased by increasing pressure, and in general, a pressure of the order of 200 atmospheres is recommended.

The yield may be facilitated by the presence of anti-oxidants, especially those of phloroglucinol type, which are themselves phenols.

If possible the reaction of the phenolate and the hydrogen should be conducted in the absence of a catalyst, since the latter may tend to bring about reduction of the phenol (formed concurrently with the hydride) and thus reduce the yield of the material to be recycled. In some instances, however, adequate yields are not obtained except through the use of a catalyst. Copper chromite catalyst is recommended. Copper itself catalyzes the reaction and in some instances the copper lining of an autoclave will furnish adequate catalysis.

It is important that the reaction zone in which the hydride is formed be free of water. In consequence, the hydrogen admitted to the reaction should be dried under drastic conditions.

As indicated hereinbefore, the alkali earth metal hydride formed by reaction of hydrogen with the corresponding phenolate may be separated from the regenerated phenol by distillation. The hydride thus formed is in a finely-divided state and is admirably suited for various purposes, for example as a source of atomic hydrogen for the reduction of refractory oxides such as titanium oxides.

I claim:

1. The improvement in the production of a hydride of an alkali earth metal which comprises reacting a phenolate of the metal with hydrogen to produce the hydride.

2. The improvement in the production of a hydride of an alkali earth metal which comprises reacting a phenolate of the metal with hydrogen to produce the hydride and the phenol corresponding to the phenolate.

3. The improvement in the production of calcium hydride which comprises reacting a calcium phenolate with hydrogen to produce the hydride and regenerate the acid phenol compound from which the phenolate is derived.

4. The improvement in the manufacture of a hydride of an alkali earth metal which comprises reacting an acid phenol with an oxide of the metal to produce a corresponding phenolate, reacting the phenolate thus formed with hydrogen to produce the hydride and regenerate the acid phenol and recycling the acid phenol for reaction with additional oxide of the metal.

5. In the manufacture of a hydride of an alkali earth metal the improvement which comprises reacting an alkali earth metal salt of an acid phenol with hydrogen to produce the hydride and the phenol.

6. In the manufacture of a hydride of an alkali earth metal the improvement which comprises reacting an alkali earth metal salt of an acid phenol with hydrogen at high pressure to produce the hydride and the phenol.

7. In the manufacture of a hydride of an alkali earth metal the improvement which comprises reacting an alkali earth metal salt of an acid phenol with hydrogen in the absence of moisture to produce the hydride and the phenol.

8. In the manufacture of a hydride of an alkali earth metal the improvement which comprises reacting an alkali earth metal salt of an acid phenol with hydrogen at high pressure but relatively low temperature to produce the hydride and the phenol.

MAURICE M. PECHET.